United States Patent [19]

Nuber et al.

[11] Patent Number: 5,067,557
[45] Date of Patent: Nov. 26, 1991

[54] MACHINE UNIT CONSISTING OF A ROTARY PISTON INTERNAL COMBUSTION ENGINE AND A ROTARY PISTON COMPRESSOR

[75] Inventors: Roland Nuber; Werner Schubert, both of Lindau; Wolfgang Sohler, Wangen; Franz Sutter, Lindau, all of Fed. Rep. of Germany

[73] Assignee: Wankel GmbH, Berlin, Fed. Rep. of Germany

[21] Appl. No.: 483,889

[22] Filed: Feb. 23, 1990

[30] Foreign Application Priority Data

Sep. 19, 1989 [DE] Fed. Rep. of Germany ....... 3930901

[51] Int. Cl.$^5$ ............................................. F25B 27/00
[52] U.S. Cl. .................................... 165/51; 62/323.4
[58] Field of Search ................ 165/51, 48.1; 62/323.4, 62/323.1; 237/2 B

[56] References Cited

U.S. PATENT DOCUMENTS

| | | | |
|---|---|---|---|
| 2,738,655 | 3/1956 | Gumpper et al. ................. | 62/323.1 |
| 3,218,820 | 11/1965 | Spatt .............................. | 62/323.1 X |
| 3,485,059 | 12/1969 | Hawks .......................... | 62/323.1 X |

*Primary Examiner*—William E. Wayner
*Attorney, Agent, or Firm*—Robert W. Becker & Associates

[57] ABSTRACT

A rotary piston internal combustion engine includes two side parts and a casing cover part with a trochoidal shaped dual-arc casing inner surfacing of a fluid-cooled housing. An eccentric shaft passes axially through the housing. A triangular piston is journalled on an eccentric of the eccentric shaft with three corners of the piston gliding along the casing inner surfacing in a continuous sliding engagement. A belt drive connects the eccentric shaft with a refrigeration compressor of the same type of construction as the internal combustion engine. A fan wheel is arranged and joined by a universal coupling joint as to a telescopic part that is nonrotatable although axially shiftable relative to a mating telescopic part connected with an output shaft of the internal combustion engine connected by a first universal coupling joint and connected by a second universal coupling joint relative to the fan wheel. The telescopic parts include a polygon cross section for the inner part and an outer part which surrounds the inner part with a corresponding polygon-cylindrical inner shape slidable in the axial direction as is necessary to take up vibration impacts between the internal combustion engine fixed in a tubular frame and the fan wheel mounted in the housing frame. A shift between cooling operation and heating operation is made possible via a vaporization valve so that cooling medium circulation can be returned to the refrigeration compressor brought to a standstill when the circulation is switched to heating operation.

3 Claims, 5 Drawing Sheets

MACHINE UNIT CONSISTING OF A ROTARY PISTON INTERNAL COMBUSTION ENGINE AND A ROTARY PISTON COMPRESSOR

BACKGROUND OF THE INVENTION

The present invention relates to a machine unit or installation, consisting of a rotary piston internal combustion engine having a fluid or liquid cooled housing consisting of two side parts and a casing or mantle part with a trochoidal shaped dual-arc raceway or mantle surface. The housing has an eccentric shaft passing therethrough and a triangular piston is journalled upon an eccentric of the eccentric shaft so that corners of the triangular piston move or glide along the raceway or mantle surface in a continuing sliding engagement, whereby the eccentric shaft is connected positively via a belt drive with a refrigeration compressor of the same type of construction as the internal combustion engine.

Such machine units or installations serve predominantly for air conditioning of large capacity vehicles as a consequence of the space-saving manner of construction of the noted machines or engines.

SUMMARY OF THE INVENTION

An object of the invention is the development of a compact transportable device or apparatus which can serve with small space requirement for climate control or air conditioning, in other words for cooling and for heating of a vehicle or a corresponding space and simultaneously can deliver or supply an electric current or power of approximately 20 kilowatts (kw). Such a device or apparatus preferably is to be employed for catastrophic situations or for military purposes.

BRIEF DESCRIPTION OF THE DRAWINGS

This object, and other objects and advantages of the present invention, will appear more clearly from the following specification in conjunction with the accompanying drawings, in which.

DETAILED CIRCULATION

Figure 1:
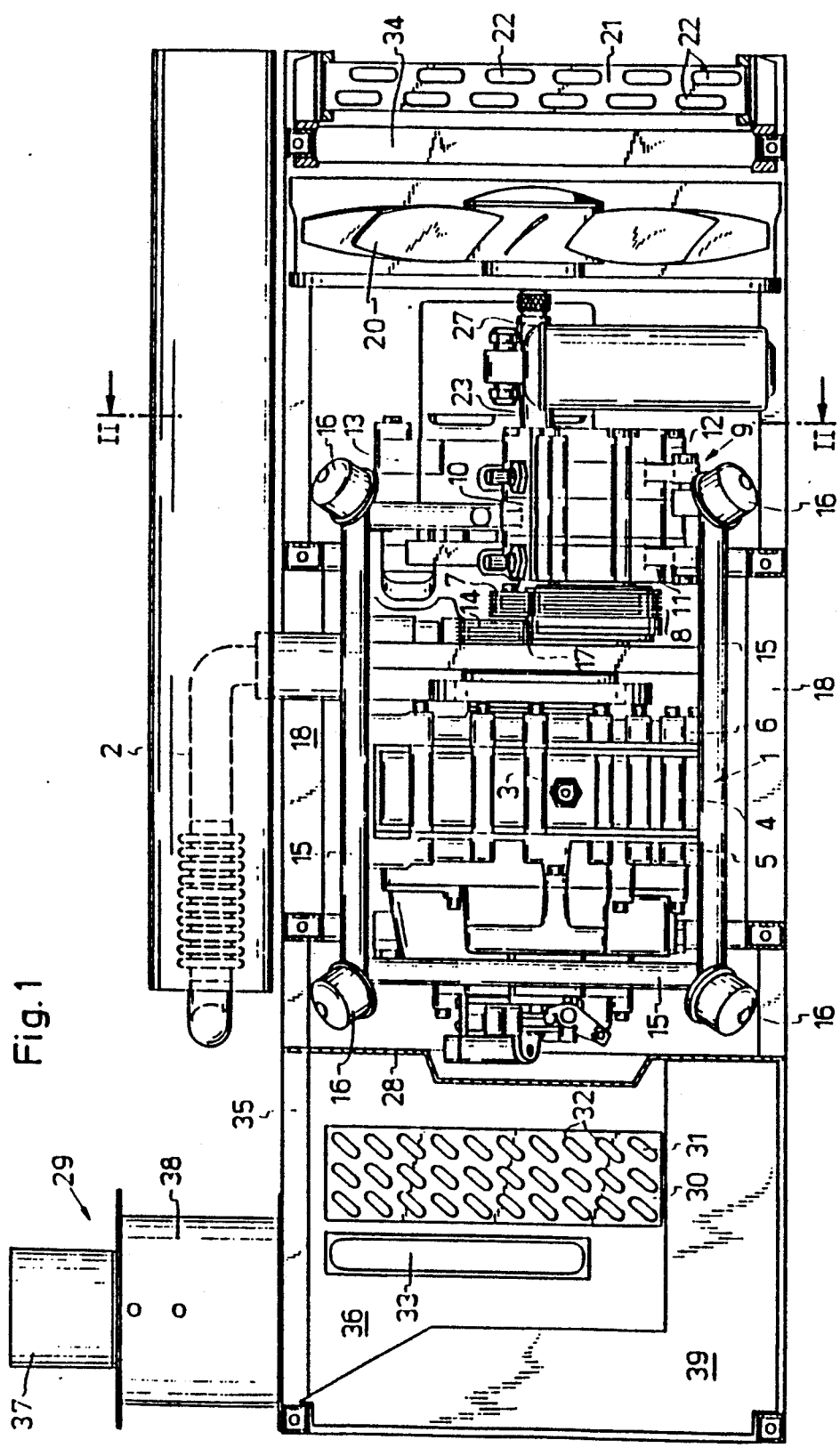
FIG. 1 is a partially sectioned side view of a machine unit of the present invention as seen upon removal of the front housing wall as shown in the drawing.
Figure 1A:
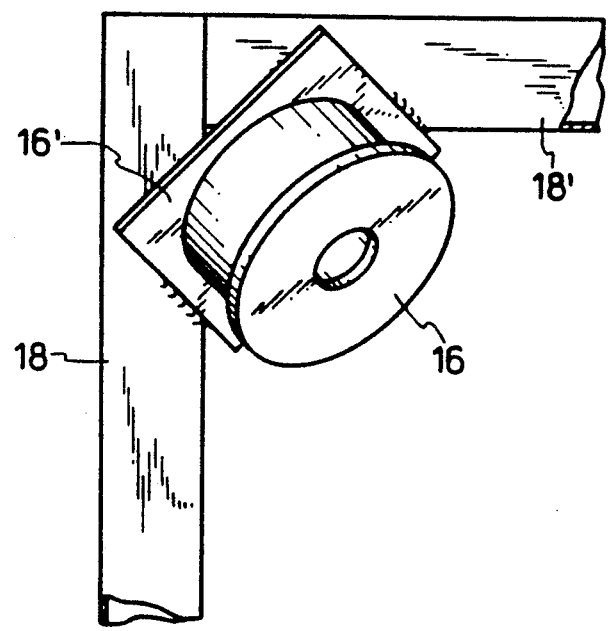
FIG. 1a is a detailed showing of how the vibration damper is connected to the housing frame.

In the center of FIG. 1 there is illustrated an internal combustion engine 1 having an initially described type of construction having a vent or exhaust pipe 2 and a readily accessible spark plug 3. The housing of this internal combustion engine 1 consists of an outer cover part or casing 4 and two side parts 5 and 6. Two belt pulleys 7 and 17 are provided upon an output shaft or trunion. Via a belt the first belt pulley 7 drives the drive pulley 8 upon a drive shaft or trunion of a refrigeration compressor 9 of the initially noted type of construction, of which a housing is formed by an outer cover part or casing 10 and two side parts 11 and 12. In FIG. 1, behind the compressor 9, there is shown an alternator or power current generator 13 of which a drive pulley 14 is connected positively via a belt with respect to the second belt pulley 17 wedged or force-fitted upon the output shaft of the internal combustion engine 1.

These three machines, the internal combustion engine 1, the refrigeration compressor 9 and the alternator or power current generator 13 are arranged in common in a tubular chassis or frame 15 which on eight corners thereof has attenuation or vibration dampers 16 made of polymeric, elastomeric resilient material, with which the tubular chassis or frame 15 is cushioned or buffered on abutment means welded housing frame 18. With that the transmittal or transfer of vibrations of the noted machines, predominantly the vibrations of the internal combustion engine 1 upon the casing or housing frame 18 and the surroundings of the machine unit installation are to be reduced to a minimum amount. The arrangement of the belt drives serves furthermore for vibration damping.

Figure 2:
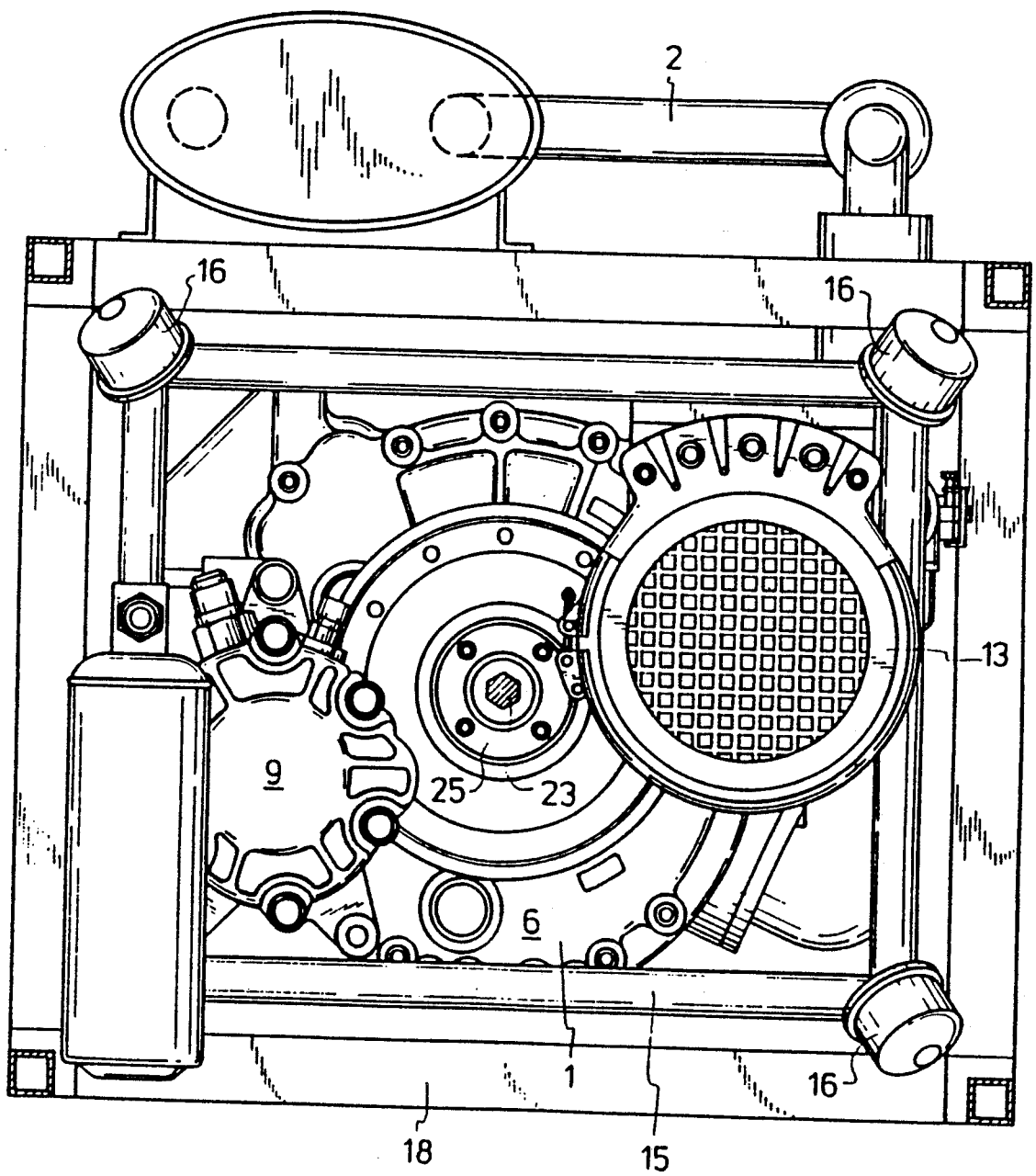
FIG. 2 is a cross-sectional view of the same machine unit taken along line II—II in FIG. 1.
Figure 3:
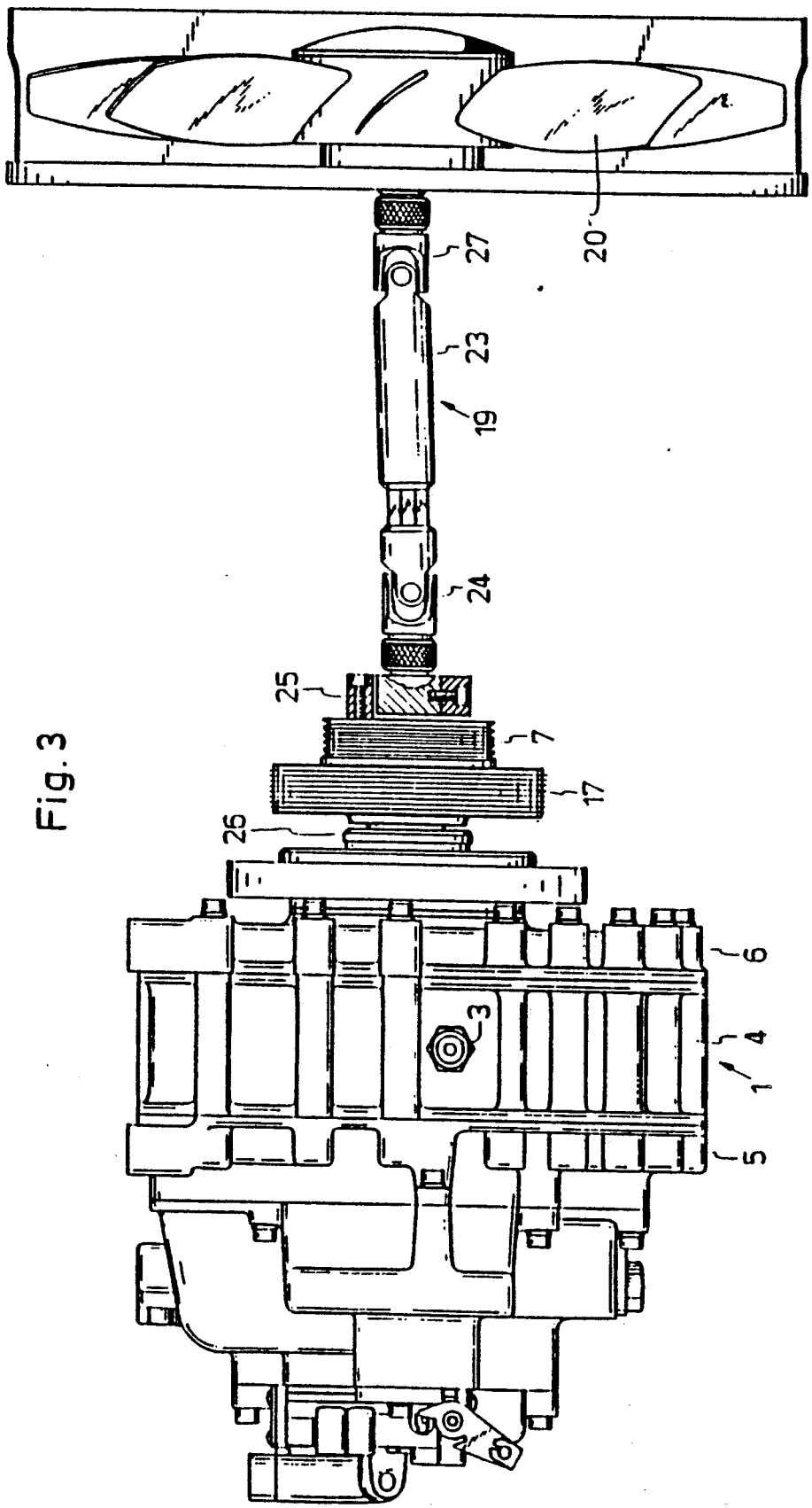
FIG. 3 is a side view showing the transmission shaft between the internal combustion engine and the fan wheel corresponding to the illustration in FIG. 1.

A shaft connection or transmission shaft 19 shown in detail in FIG. 3 drives a fan wheel 20 which is arranged behind a condenser 21 which has volatized or vaporized and again heated or warmed cooling medium of the cooling medium circulation of the compressor 9 flowing through the condenser 21. The cooling coils or condensing tubes 22 of the condenser 21 emerge therefrom on the sides and return in a U-shaped bend. The shaft connection 19 consists of a telescopic piece or part 23 axially shiftable in itself but nonrotatable in itself which is connected with the fan wheel 20 via a first universal coupling or joint 24 via a torsional-vibration damper or balancer 25 with an output shaft 26 of the internal combustion engine being connected via a second universal coupling or joint 27 with the fan wheel 20. The telescopic part 23 consists of an inner part with a polygonal or hexagonal cross section as is apparent in FIG. 2 which is arranged at the universal coupling or joint to be placed with respect to the internal combustion engine 1 and a mantle or outer cover part or casing which is connected with the other or second universal coupling or joint and which surrounds the inner part slidably in an axial direction with a corresponding polygonal or hexagonal-cylindrical inner shape. This arrangement is necessary in order to receive or take up the vibration impacts between the internal combustion engine 1 fixed or stationary in the tubular frame 17 and the fan wheel 20 journalled in the housing frame or casing 18.

Figure 4:
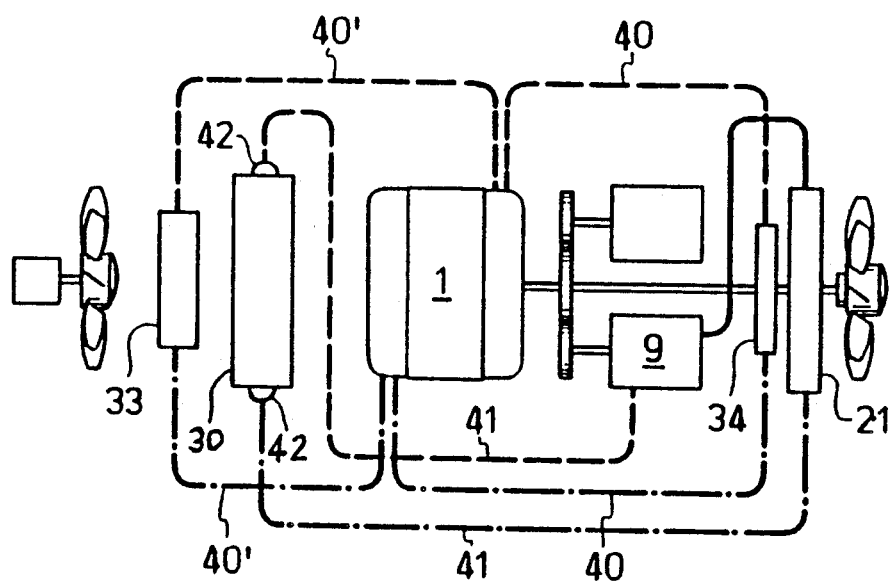
FIG. 4 is a view that shows a schematic diagram illustrating the cooling medium circulation.

The left side of FIG. 1 illustrates the air conditioning unit or system 29 provided as separated by an intermediate wall 28; the air conditioning unit or system 29 serves as a climatizing means for cooling of the refrigerant by means of the refrigeration compressor 9 as to the evaporator 30 provided with a cooling coil or tube 31 which is reversed or diverted at 32 respectively in U-shaped bends externally of the cooler or radiator and which tube 31 can have cooling medium flowing therethrough vaporized by an expansion 42 illustrated in FIG. 4. For heating operation, the heat exchanger 33 is provided which can have hot cooling water of the internal combustion engine 1 flowing therethrough. The evaporator 30 and heat exchanger 33 can be connected or switched into operation alternatively. The cooling water flow of the internal combustion engine 1 is cooled when the air conditioning or climatization control is switched to cold or refrigeration so that this cooling water flow is cooled in the cooler or radiator 34 which is arranged between the fan wheel 20 and the condenser 21. The environmental air enters at 35 into the housing space or chamber 36 behind the intermediate wall 28 and is conveyed upwardly by a pipe or tube 37 of large diameter in which a suction blower 38 is provided and such environmental air after cooling thereof respectively heating thereof is suctioned away by this blower 38 and conveyed into the room, space or chamber to be air conditioned or climatized.

A L-shaped fuel tank 39 is provided below the housing space or chamber 36 as shown in the sectional view and this fuel tank in this position likewise is cooled respectively heated or warmed-up.

The cooling respectively refrigeration medium circulation is illustrated schematically in the view of FIG. 4. The cooling medium circulation 40 of the internal combustion engine 1 passes alternatively from the housing thereof to the cooler or radiator 34 respectively designated with a reference numeral 40' upon switching to warming or heating of the environmental air to the heat exchanger 33 and respectively from there back to the housing of the internal combustion engine 1 The cooling medium circulation or cycle 41 proceeds with compressed refrigeration or cooling means from the refrigeration compressor 9 via the vaporization valve 42 into the evaporator 30 in the space or chamber 36 and from there in an expanded condition to the condenser 21, where the cooling medium is condensed. From there the cooling medium circulation or cycle 41 passes back to the compressor 9.

If a shift or switching is made to heating, the refrigeration compressor 9 is caused to stop or come to a standstill by release of a magnetic coupling located below or under the drive pulley 8 and with that the cooling medium circulation 41 is also brought to a stop or standstill.

The advantage of the present invention is primarily recognized in the close assembly and construction of the individual elements or parts of this machine unit, which is made possible only by employment of the rotary piston engines of the initially mentioned structural type. Consequently with a capacity of the alternator or power unit of 20 kw and sufficient or adequate air conditioning or climatization for a vehicle or a tent for example when employed in a catastrophic situation with a cubic content of approximately 1000×350×450 mm being made possible therewith.

In summary, the present invention relates to a machine unit or installation consisting of a rotary piston internal combustion engine with a housing that has two side parts and a mantle or outer cover part with an internal trochoidal shaped dual-arc inner surfacing or mantle runway with a housing being liquid cooled. The housing has an eccentric shaft that passes axially therethrough and a triangular piston carried on an eccentric of the eccentric shaft glides along in continuous sliding engagement of the corners of the piston along the casing raceway or inner surfacing, whereby the eccentric shaft is connected via a belt drive positively with a refrigeration compressor of the same type of construction as the internal combustion engine.

The machine unit or installation furthermore provides the following features:

a) An inner tubular frame 15 is connected with a housing frame 18 having an outer sheeting or plate-clad arrangement and this housing frame 18 is connected as to an inner tubular frame 15 via vibration dampers 16 of resilient or elastically deformable synthetic material and with which the internal combustion engine 1 and the refrigeration compressor 9 and a power current generator or alternator 13 axially parallel beside the refrigeration compressor 9 are arranged and are connected positively with a belt drive 8, 14, 17 as to the output shaft 26 of the internal combustion engine 1.

b) At the interface, front side, face or end of the housing frame 18 there are arranged a condenser 21 for the return-flowing refrigerating medium of the refrigeration compressor 9 and there behind extending over or across a distance there is provided a shaft connection equalizing vibrations between the tubular frame 15 and the housing frame 18 joined as to the drive stud or shaft 26 of the internal combustion engine 1 which drives or powers the fan wheel.

c) In the rear part of the housing frame 18 located across from the fan wheel there is provided a climatization or an air conditioning system 29 including behind the inlet or entry opening 35 for surrounding or environmental air to have an evaporator 30 for cooling operation with cooling medium of the refrigeration compressor 9 flowing therethrough vaporized in an expansion valve 42 arranged ahead of the same and behind this there being included a heat exchanger 33 for the cooling water of the internal combustion engine 1 for heating operation as well as a blower 38 in a discharge tube 37 for the air conditioned or climatized air.

d) In the cooling water circulation 40, 40' of the combustion engine 1 there is provided a switching or shifting valve with which conversion of operation can be undertaken upon shifting from heating operation to cooling operation rom a heat exchanger 33 in the air conditioning or climatization system 29 to a cooler or radiator 34 which is arranged between the fan wheel 20 and the cooler or radiator 21; furthermore a magnetic coupling is provided between the drive pulley 8 and the refrigeration compressor 9, with which the refrigeration compressor can be brought to a standstill during heating operation.

The shaft connection 19 consists of a first universal coupling or joint 24 and a telescopic part 23 of parts shiftable axially as to each other although non-rotatable among each other and a second universal coupling or joint 27 of which the outer member is connected securely and rigidly with the fan wheel 20 and that furthermore a torsional damping means 25 is provided between the first universal coupling or joint 24 and the output shaft 26 of the internal combustion engine 1.

The telescopic part 23 consists of an inner part having a polygonal cross section which is arranged on a universal coupling or joint and including a mantle, cover or casing part arranged on the other universal coupling or joint, which cover or casing envelops or surrounds the inner part in an axial sliding relationship with a corresponding polygonal-cylindrical inner shape.

The present invention is, of course, in no way restricted to the specific disclosure of the specification and drawings, but also encompasses any modifications within the scope of the appended claims.

What we claim is:

1. A machine installation, consisting of a rotary piston internal combustion engine with a housing, the housing being fluid cooled and including a shaft which passes axially through the housing, whereby said shaft is connected positively via a belt drive with a refrigeration compressor of the same type of construction as the internal combustion engine, comprising:

a) a housing frame clad with an external sheeting and connected with an inner tubular frame via oscillation dampers of elastically deformable synthetic material, in which frame the internal combustion engine and the refrigeration compressor as well as the power supply generator axially parallel beside the refrigeration compressor are arranged and the internal combustion engine having an output shaft is connected positively with a belt drive;

b) at an end face of the housing frame there are arranged a condenser for the return flow of the refrigerating medium of the refrigeration compressor and there behind a shaft connection equalizing the vibrations between the tubular frame and the housing frame is arranged extending across to the drive shaft of the fan wheel driven by the internal combustion engine;

c) in a rear part of the housing frame located opposite to the fan wheel there is provided a climatization air conditioning system which behind the inlet opening for environmental air has an evaporator for refrigeration operation capable of having cooling medium of the refrigeration compressor flowing therethrough vaporized in an expansion valve arranged therebefore and behind this having a heat exchanger for the cooling water of the internal combustion engine for heating operation as well as a blower for the climatized air/conditioned air and located in a discharge tube; and d) in a cooling water circulation of the internal combustion engine there is provided a shift valve with which outcome thereof upon switching from heating operation to cooling operation causes circulation to be diverted from the heat exchanger in the climatization air condition system to a radiator, which is arranged between the fan wheel and the condenser and furthermore a magnetic coupling is provided between the drive pulley and the refrigeration compressor with which the refrigeration compressor can be brought to a standstill during heating operation.

2. A machine installation according to claim 1, in which a shaft connection includes a first universal coupling joint and a telescopic part having components shiftable axially against each other although nonrotatable among each other and also including a second coupling joint, of which an outer member is connected rigidly with the fan wheel and that between the first universal coupling joint and the output shaft of the internal combustion engine there is provided a torsional damper means.

3. A machine installation according to claim 2, in Which the telescopic part consists of an inner part having a polygonal cross section, which is arranged on a universal coupling joint and a casing part arranged on another universal coupling joint and which surrounds the inner part in an axial sliding manner with a corresponding polygon-cylindrical inner shape.

* * * * *

UNITED STATES PATENT AND TRADEMARK OFFICE
CERTIFICATE OF CORRECTION

PATENT NO. : 5,067,557
DATED : 26 November 1991
INVENTOR(S) : ROLAND NUBER ET AL It is certified that error appears in the above-identified patent and that said Letters Patent is hereby corrected as shown below:

On the title page, the priority data is corrected to read as follows:
-- [30]  Foreign Application Priority Data Sep. 15, 1989 [DE]  Fed. Rep. of Germany...3930901

Signed and Sealed this

Sixteenth Day of March, 1993

Attest:

STEPHEN G. KUNIN

*Attesting Officer*    Acting Commissioner of Patents and Trademarks